(12) United States Patent
Wang

(10) Patent No.: US 7,429,029 B2  
(45) Date of Patent: Sep. 30, 2008

(54) SEALING STRUCTURE FOR A ROTARY VALVE OF A SQUIRT GUN

(76) Inventor: Hsin-Fa Wang, No. 68, Mou Tan Lane, Shao An Li, Lu Kang Town, Chang Hua Hsien City (TW)

( * ) Notice: Subject to any disclaimer, the term of this patent is extended or adjusted under 35 U.S.C. 154(b) by 81 days.

(21) Appl. No.: 11/554,344

(22) Filed: Oct. 30, 2006

(65) Prior Publication Data
    US 2008/0099711 A1      May 1, 2008

(51) Int. Cl.
    *F16K 5/00*         (2006.01)
(52) U.S. Cl. .................. 251/309; 239/526; 239/586
(58) Field of Classification Search ......... 251/309–312; 239/526, 586
    See application file for complete search history.

(56) References Cited
    U.S. PATENT DOCUMENTS 3,133,723 A  *  5/1964  Goldman et al. ............ 251/309
    3,343,802 A  *  9/1967  Schuilwerve ................ 251/175
    4,262,880 A  *  4/1981  Danko et al. ................. 251/288
    5,188,144 A  *  2/1993  Radossi ................. 137/315.25
    5,234,193 A  *  8/1993  Neal et al. ................... 251/175
    5,984,207 A  * 11/1999  Wang ......................... 239/526

* cited by examiner

*Primary Examiner*—John K Fristoe, Jr.
(74) *Attorney, Agent, or Firm*—Egbert Law Offices.

(57) ABSTRACT

The present invention is a sealing structure for a rotary valve of a squirt gun. The rotary valve is placed into a housing of the squirt gun body between an inlet duct and an outlet duct. The rotary valve is provided with a through hole, and both ends of the rotary valve are connected to a button outside of the squirt gun body. The rotation angle of the rotary valve can be adjusted to control the switching or misalignment state between the through hole of the rotary valve and the inlet duct and the outlet duct. A flexible sealer is placed on the outer wall of the rotary valve opposite to the inlet duct or outlet duct of the squirt gun body. When the through hole of the rotary valve is misaligned with the inlet duct and outlet duct, the flexible sealer is placed opposite to the inlet duct or outlet duct to achieve water-tightness, thereby reducing the components and saving the manufacturing cost for improved industrial applications.

6 Claims, 9 Drawing Sheets

SEALING STRUCTURE FOR A ROTARY VALVE OF A SQUIRT GUN

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a squirt gun, and more particularly to an innovative squirt gun with an improved sealing structure for the rotary valve.

2. Description of Related Art Including Information Disclosed Under 37 CFR 1.97 and 37 CFR 1.98.

Given the fact that traditional squirt guns cannot meet diversified customer demands due to uncontrollable water discharge, the inventor has developed a control structure of a squirt gun as shown in FIG. 1. A feature of squirt gun 10 is a rotary valve 14 placed between inlet duct 12 and outlet duct 13 of the body 11. The rotary valve 14 could be coupled to a button 15 outside of the body 11 such that it is possible to control its rotating angle and also the switching or misaligned state between through hole 16 of rotary valve 14 and inlet duct 12 and outlet duct 13. A water sealer 20 is configured at the connecting end of outlet duct 13 and rotary valve 14. The water sealer 20 comprises a flexible seal ring 21 used to fix its locating ring 22. The configuration of water sealer 20 prevents water leakage when rotary valve 14 is closed alternatively. The major purpose of the present invention is to improve the water sealer 20 so as to reduce the consumption of raw materials, and also save manufacturing and assembly cost.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

There is enhanced efficacy of the present invention. The improved sealing structure for the rotary valve of a squirt gun of the present invention is based upon a flexible sealer being placed onto an outer wall of the rotary valve 30 opposite to outlet duct 42 of the squirt gun body 40. When the through hole 31 of rotary valve 30 is misaligned with inlet duct 41 and outlet duct 42, the flexible sealer could be placed opposite to outlet duct 42 to avoid water leakage. As compared to a conventional water sealer, which is comprised of a flexible seal ring and locating ring, the present invention allows the user to install a trough 33 onto an outer wall of the rotary valve 30 and also a sealer 60, or to employs a flexible surface 70 to serve the purpose of water leakage. Thus, it is possible to reduce the components and save manufacturing and assembly costs for better industrial applications.

Although the invention has been explained in relation to its preferred embodiment, it is to be understood that many other possible modifications and variations can be made without departing from the spirit and scope of the invention as hereinafter claimed.

BRIEF DESCRIPTION OF THE SEVERAL VIEWS OF THE DRAWINGS

FIG. 4 shows an assembled sectional view of the present invention, when the water supply is turned on.

DETAILED DESCRIPTION OF THE INVENTION

Figure 1:
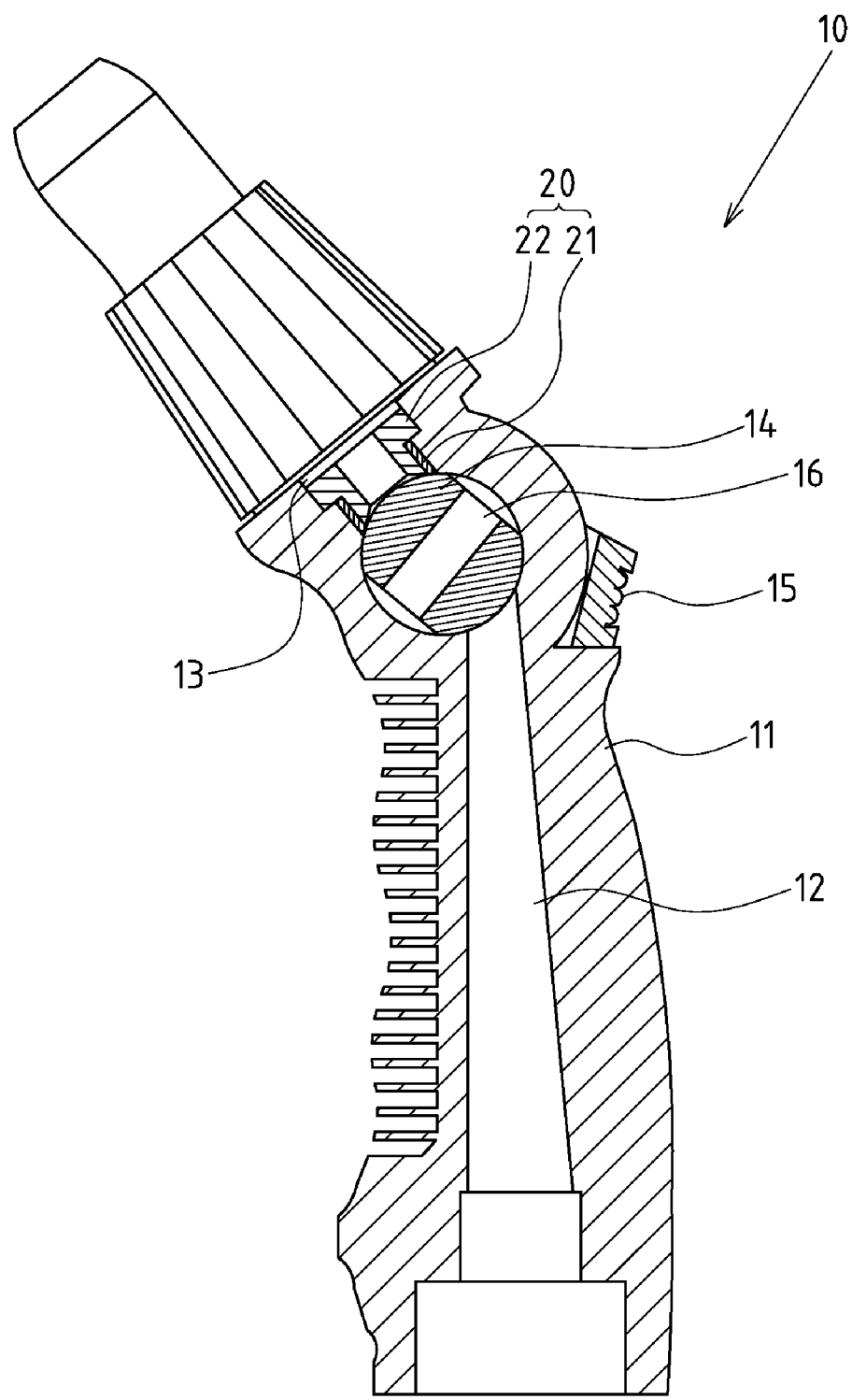
FIG. 1 shows an assembled sectional view of the prior art.

The features and the advantages of the present invention will be more readily understood upon a thoughtful deliberation of the following detailed description of a preferred embodiment of the present invention with reference to the accompanying drawings.

FIGS. 2, 3, 4, and 5 depict preferred embodiments of the improved sealing structure for a rotary valve of a squirt gun of the present invention. The embodiments are provided only for explanatory purposes. The scope of the patent is set by the claims.

The rotary valve 30 is placed into a housing 43 of squirt gun body 40, which is axially installed between inlet duct 41 and outlet duct 42. The rotary valve 30 is provided with a radial through hole 31. At both sides of rotary valve 30, watertight rings 32 are assembled to be mated closely with the housing 43. Both ends of the rotary valve 30 are connected to a convex button 50 outside of the squirting gun body 40, such that the rotation angle of rotary valve 30 could be adjusted by the button 50 to control the switching or misaligned state between through hole 31 of rotary valve 30 and inlet duct 41 and outlet duct 42. A key feature of the present invention is the flexible sealer being placed into an outer wall of rotary valve 30 opposite to the outlet duct 32 of the squirt gun body 40. The flexible sealer is available with several embodiments.

Figure 2:
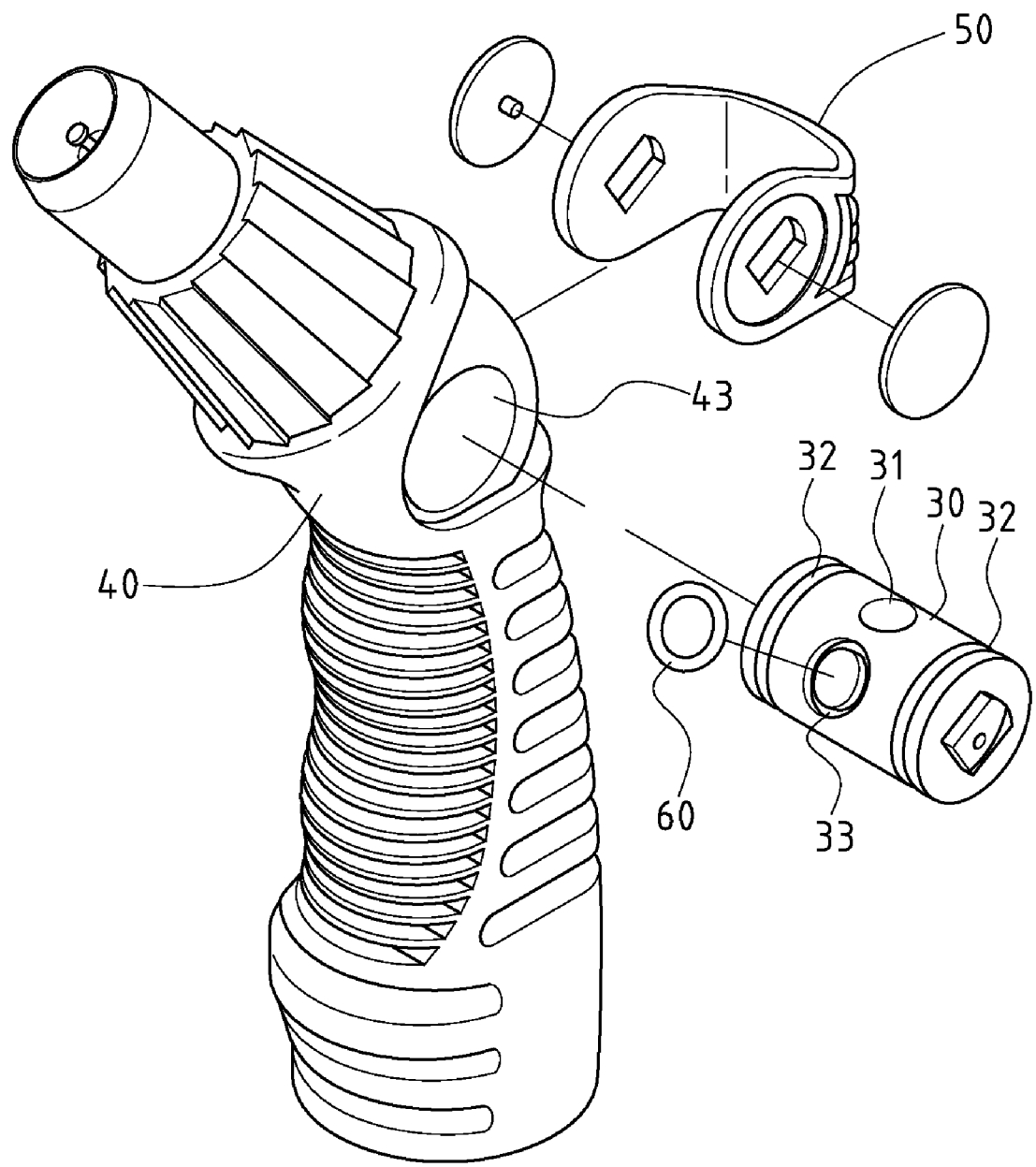
FIG. 2 shows an exploded perspective view of the present invention.
Figure 3:
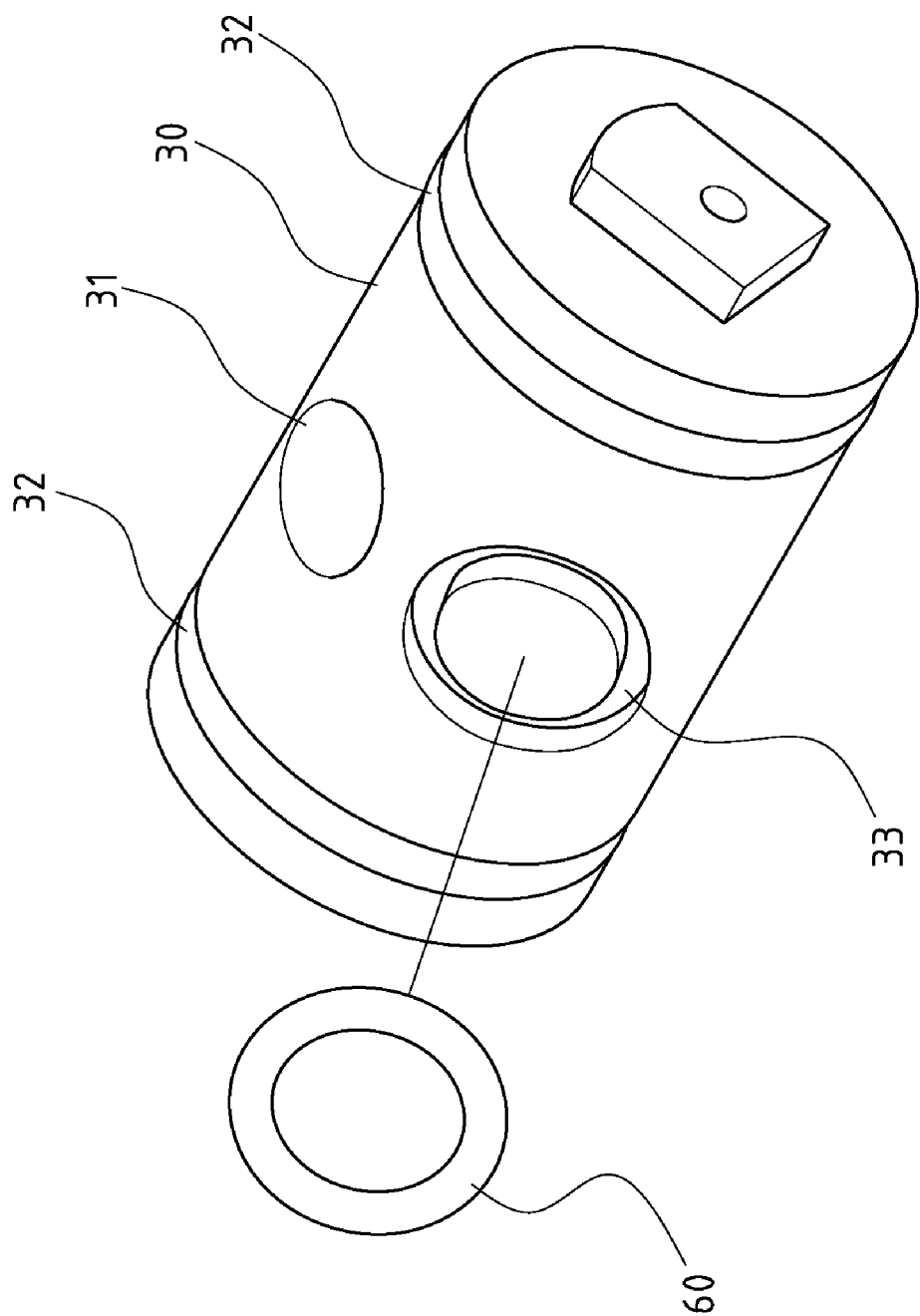
FIG. 3 shows a partially enlarged perspective view of the present invention.

FIGS. 2 and 3 depict one preferred embodiment of the flexible sealer. A trough 33 is set at an outer wall of rotary valve 30 to accommodate the flexible sealer 60. The trough 33 may be formed with a ring groove such that the sealer 60 forms an O-ring.

Figure 8:
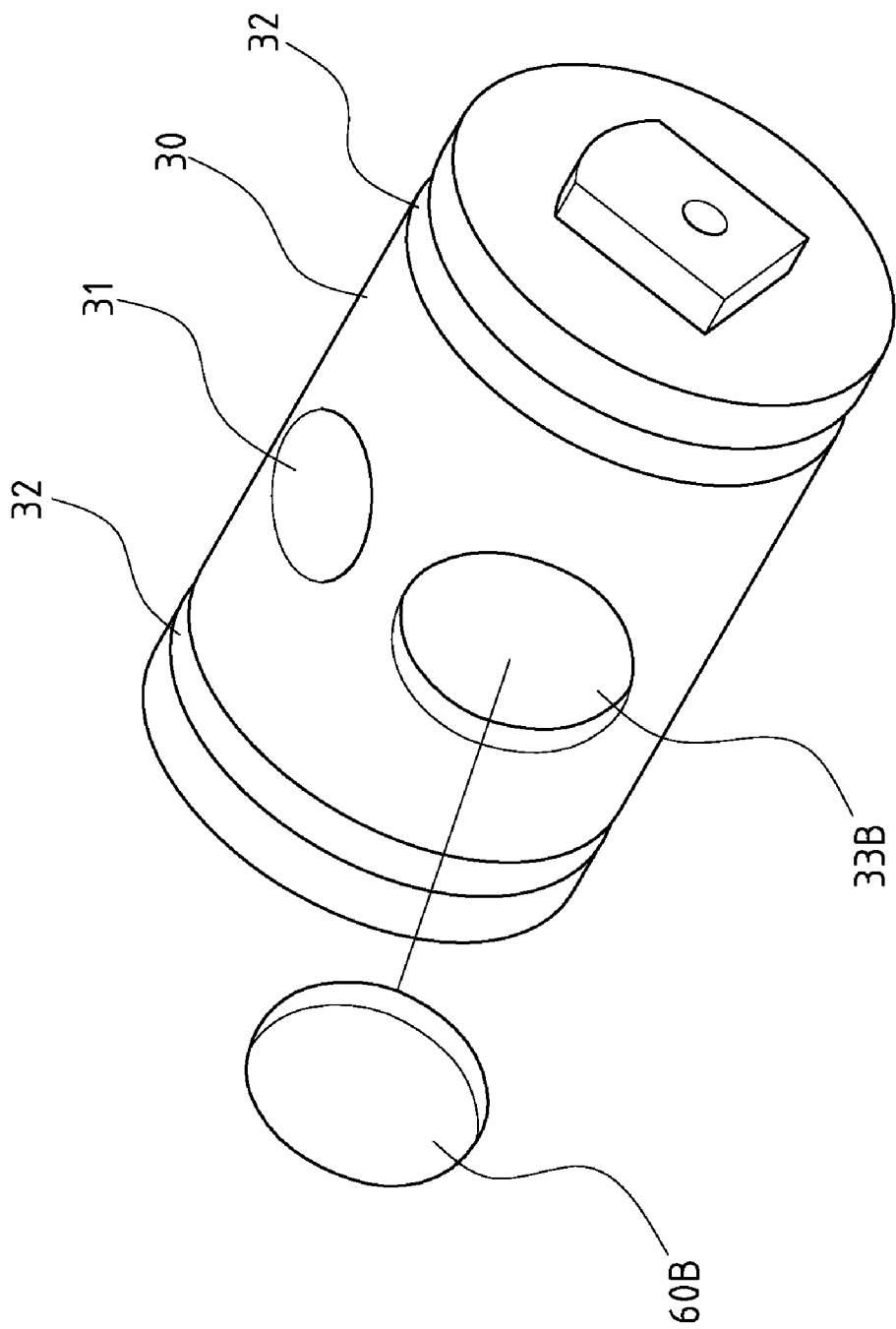
FIG. 8 shows another perspective view of a preferred embodiment of a trough and sealer of the present invention.

Referring to FIG. 8, the trough 33B is a curved profile. The sealer 60B of the present invention is formed as a gasket.

Figure 5:
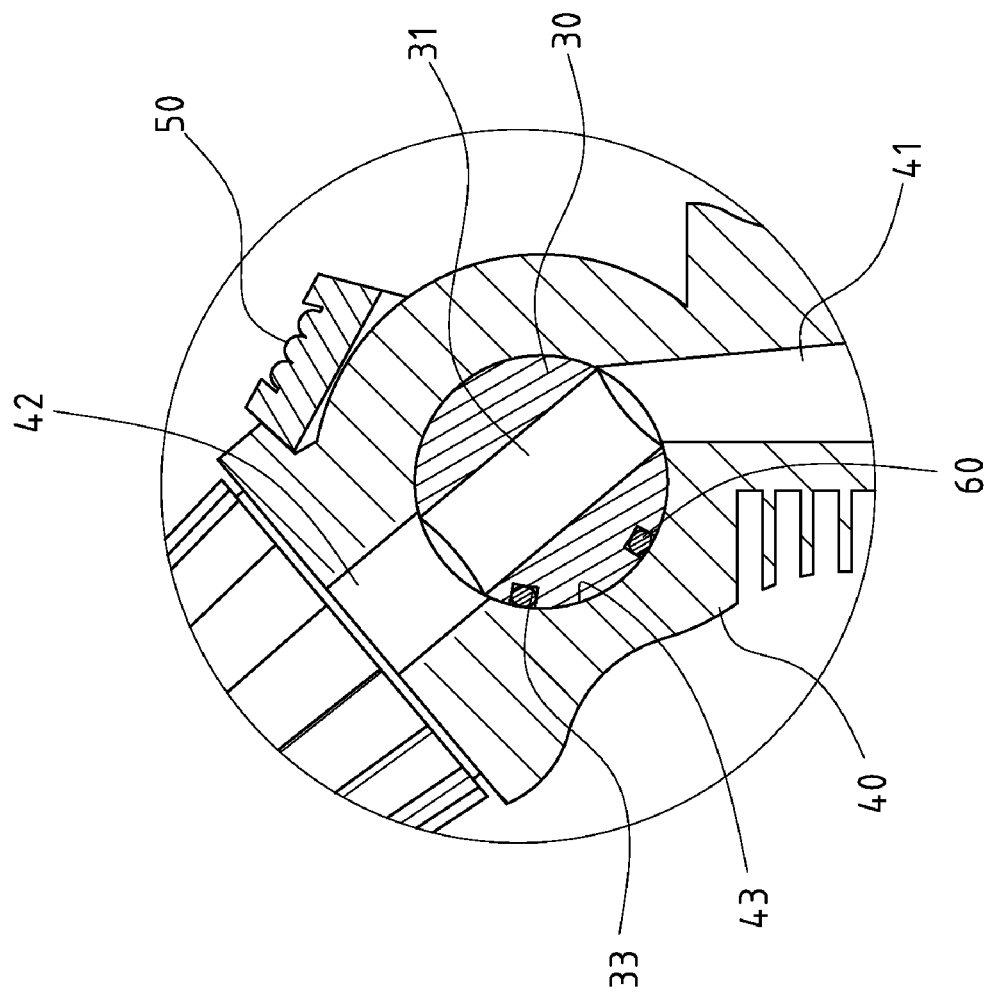
FIG. 5 shows a partially enlarged sectional view of rotary valve in FIG. 4.
Figure 4:
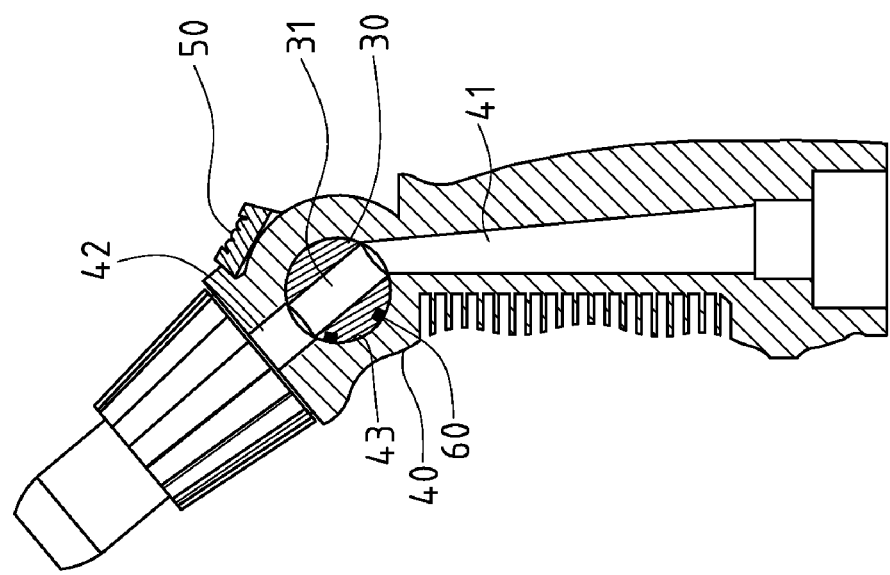

The present invention operates as follows:

Referring to FIGS. 4 and 5, when the button 50 is pulled up, through hole 31 of the rotary valve 30 could be adjusted to align with inlet duct 41 and outlet duct 42 for an open state. In such a case, the sealer 60 on the outer wall of rotary valve 30 does not function.

Figure 7:
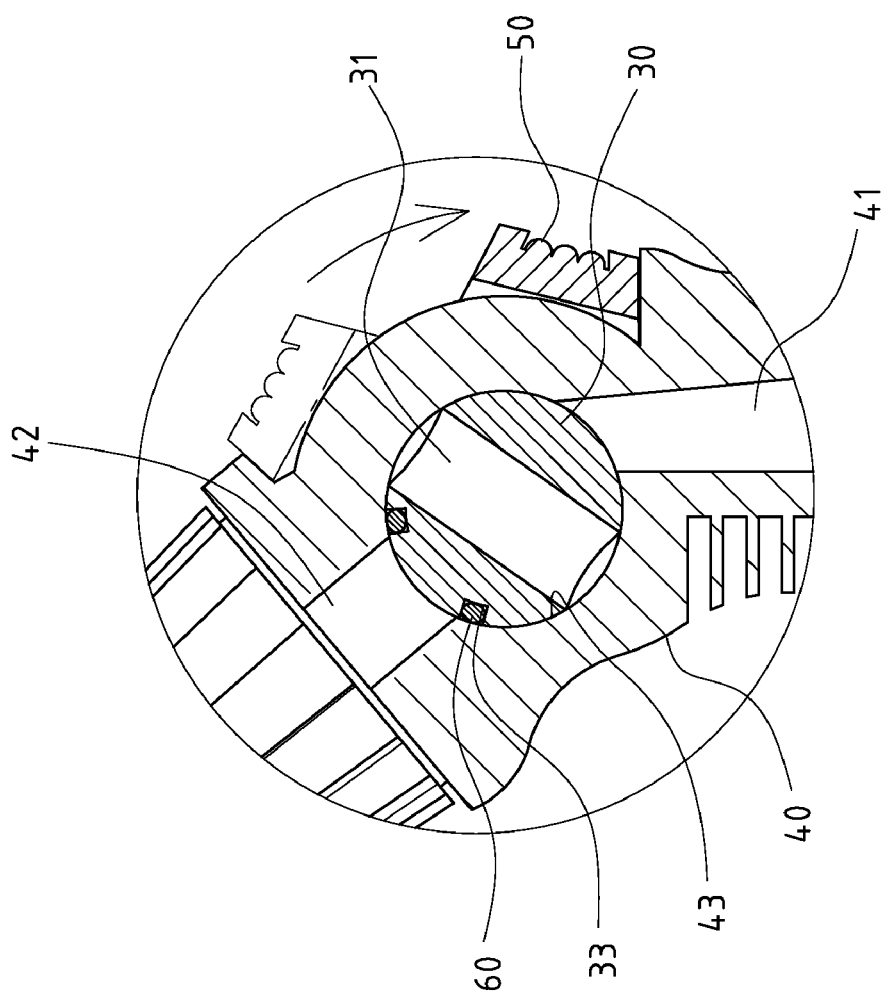
FIG. 7 shows a partially enlarged sectional view of rotary valve in FIG. 6.
Figure 6:
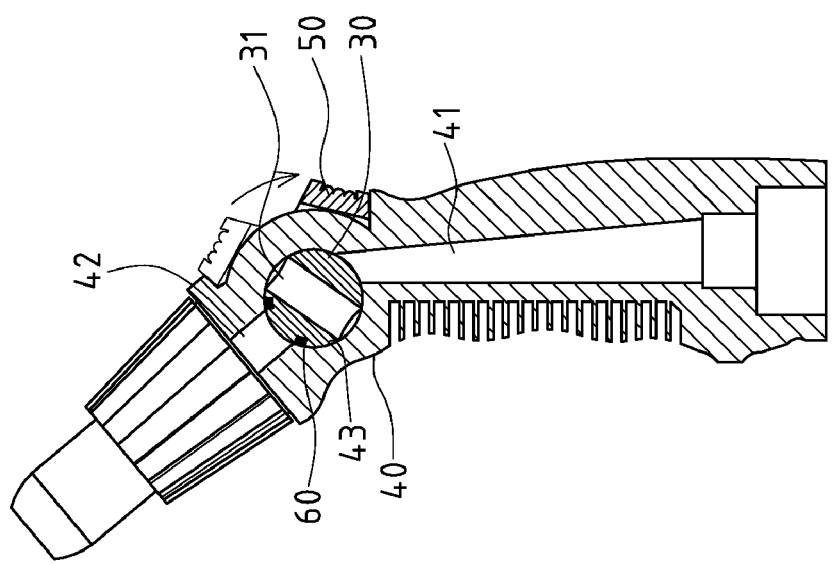
FIG. 6 shows another assembled sectional view of the present invention, when the water supply is turned off.

Referring to FIGS. 6 and 7, when through hole 31 of rotary valve 30 is misaligned with inlet duct 41 and outlet duct 42, the water supply is shut off. In such case, the sealer 60 is positioned opposite to outlet duct 42 to avoid any water leakage.

Figure 9:
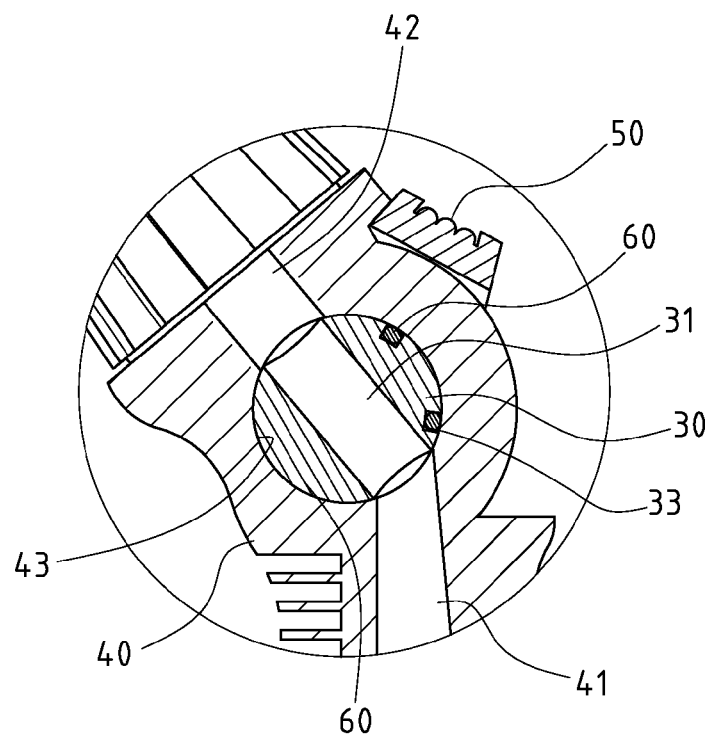
FIG. 9 shows another sectional view of another preferred embodiment of the flexible sealer of the present invention in FIG. 8.
Figure 10:
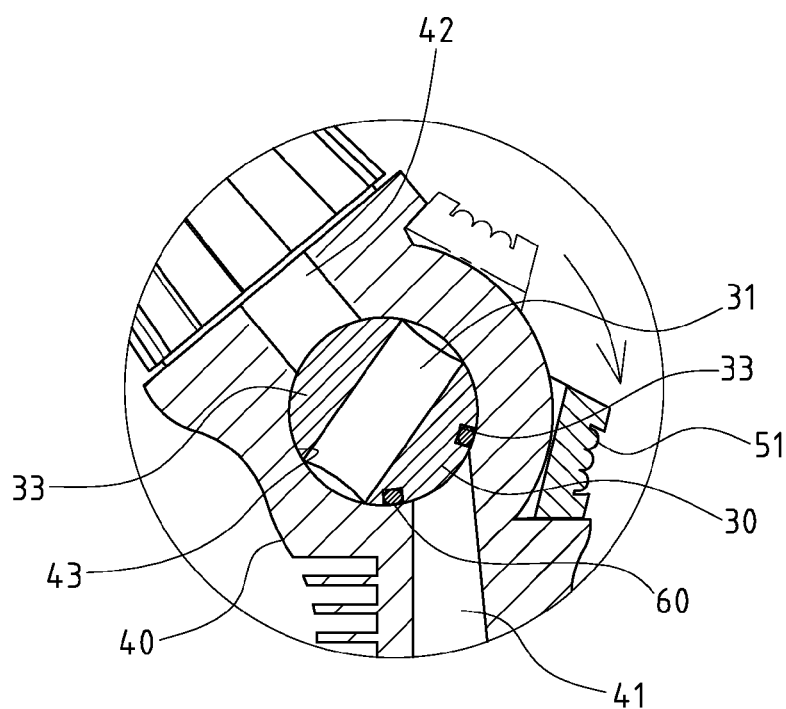
FIG. 10 shows another partial sectional view of the structure in FIG. 9.

Referring also to FIGS. 9 and 10, the flexible sealer can also be installed into an outer wall of rotary valve 30 opposite to inlet duct 41 of squirt gun body 40. So, when through hole 31 of rotary valve 30 is positioned opposite to inlet duct 41 and outlet duct 42, the water supply is shut off. In such case, the flexible sealer 60 is positioned opposite to inlet duct 41 to avoid water leakage.

Figure 11:
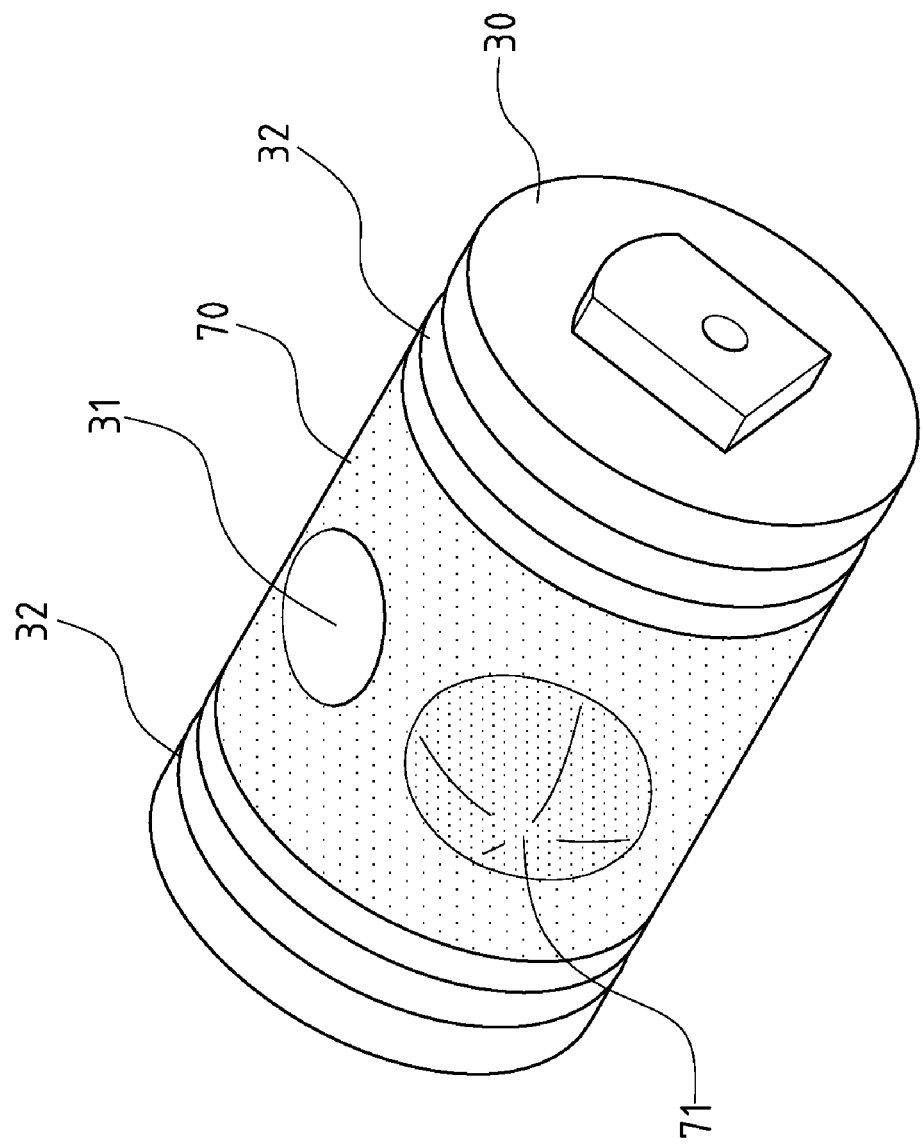
FIG. 11 shows a perspective view of still another preferred embodiment of flexible sealer of the present invention.
Figure 12:
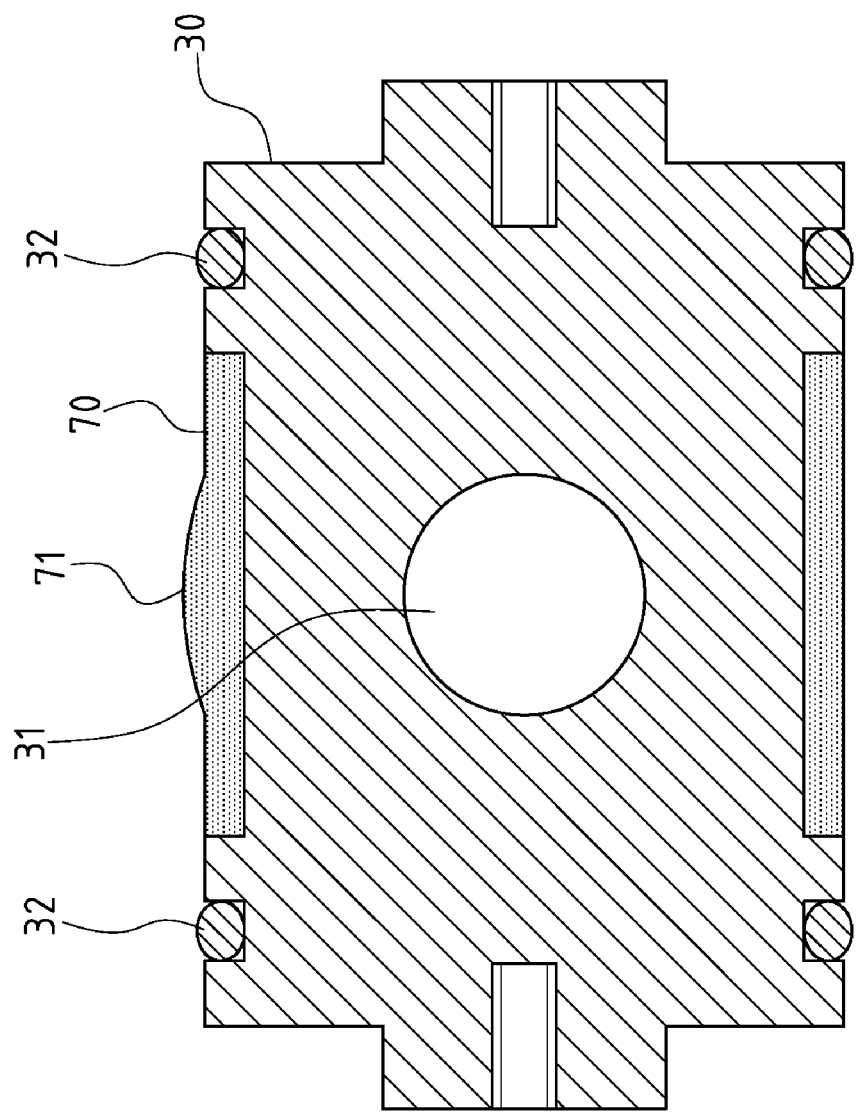
FIG. 12 shows a sectional view of the preferred embodiment of flexible sealer of the present invention in FIG. 11.

FIGS. 11 and 12 depict another preferred embodiment of the flexible sealer. A circular flexible surface 70 (rubber) is covered onto outer wall of the rotary valve 30. A convex 71 is set at a preset location of this flexible surface 70. When through hole 31 of the rotary valve 30 is misaligned with inlet duct 41 and outlet duct 42 (referring to FIGS. 6 and 7), the convex 71 of the flexible surface 70 is positioned opposite to inlet duct 41 or outlet duct 42 to avoid water leakage.

The invention claimed is:

1. An apparatus comprising:
    a squirting gun body having an inlet duct and an outlet duct and a housing formed therebetween, said inlet duct being angularly offset from axial alignment with said outlet duct;
    a rotary valve rotatably mounted in said housing, said rotary valve having a radial through hole with a first end opening on one side of said rotary valve and a second end opening on an opposite side of said rotary valve, said rotary valve having a an outer wall;
    a convex button connected to opposite ends of said rotary valve, said convex button having a surface positioned adjacent an exterior of said squirt gun body, said convex button movable so as to rotate said rotary valve between a first position in which said first end of said hole is aligned with said inlet duct and said second end of said hole is aligned with said second duct and a second position in which said first and second ends of said hole are offset respectively from said first and second ducts; and
    a flexible sealer affixed to said outer wall of said rotary valve in a position between said first and second ends of said hole, said flexible sealer positioned around an end of one of said first and second ducts when said rotary valve is in said second position.

2. The apparatus of claim 1, said rotary valve having a trough formed in said outer wall thereof, said flexible sealer received in said trough.

3. The apparatus of claim 2, said flexible sealer being an O-ring.

4. The apparatus of claim 2, said trough having a curved profile.

5. The apparatus of claim 1, said flexible sealer comprising a circular flexible surface positioned on said outer wall of said rotary valve, said circular flexible surface covering an end of one of said first and second ducts when said rotary valve is in said second position.

6. The apparatus of claim 1, further comprising a first ring affixed circumferentially around said rotary valve on one side of said hole and a second ring affixed circumferentially around said rotary valve on an opposite side of said hole, said first and second rings being in watertight sealing relationship with a wall of said housing.

* * * * *